United States Patent

[11] 3,602,275

| [72] | Inventor | Richard Bent Nissen<br>Langaa, Denmark |
|---|---|---|
| [21] | Appl. No. | 764,463 |
| [22] | Filed | Oct. 2, 1968 |
| [45] | Patented | Aug. 31, 1971 |
| [32] | Priority | Oct. 3, 1967, Oct. 10, 1967 |
| [33] | | Denmark |
| [31] | | 4898/67 and 5409/67 |

[54] WOODWORKING MACHINE
5 Claims, 8 Drawing Figs.

[52] U.S. Cl................................................ 144/3 R,
144/91, 144/218, 144/313
[51] Int. Cl.................................................. B27c 9/00
[50] Field of Search........................................ 144/3, 90,
91, 218, 309, 313–317, 321, 323, 326; 156/250,
256, 258, 510, 516, 544, 546, 548

[56] References Cited
UNITED STATES PATENTS
2,300,728 11/1942 Goss............................ 144/309

| 3,126,308 | 3/1964 | Brockerman et al. ......... | 144/317 |
|---|---|---|---|
| 3,179,135 | 4/1965 | Windsor....................... | 144/91 |
| 3,308,861 | 3/1967 | Hamilton....................... | 144/3 |

FOREIGN PATENTS
| 1,391,273 | 1/1965 | France......................... | 144/313 |

*Primary Examiner*—Gerald A. Dost
*Attorney*—Parrott, Bell, Seltzer, Park & Gibson ABSTRACT: A woodworking machine for endwise joining of oblong wooden members by means of finger joints. The machine includes a magazine for storing of wooden members to be joined, feeding means for successively feeding wooden members from the magazine, a joining station for receiving the wood members, cutting fingers in opposed ends of two wooden members, applying glue to the cut fingers and joining the glued cut fingers in meshing relationship, whereby cutting, glueing and joining of the wooden members are accomplished at the same station in the machine. The machine may further include a cutoff station and an end stop mechanism.

WOODWORKING MACHINE

The present invention relates to a woodworking machine and more specially a machine for end joining pieces of wood or lumber by means of cut and glued finger joining and subsequently cutting the lumber to desired standard length.

For many applications lumber is required in specified standard length which may not coincide with the length delivered from the sawmills. Thus to reduce wastes machines have been proposed for end-to-end finger joining and glueing of tow pieces of lumber, If the desired length has not been achieved the joined pieces are after setting of the glue returned to the machine for further joining with another a piece of lumber. By the known machine the lumber pieces to be joined are transferred transversely to their longitudinal direction in two rows through a number of stations where the ends to be joined are successively trimmed, moistured, provided with fingers which are made by impression for a sufficient length of time by means of dies which are heated to ensure that the impressed fingers will maintain their configuration. In the following station glue is applied to the fingers and in the last station the two pieces of lumber are pressed together with the fingers intermeshing. Also a machine is known whereby two pieces of lumber to be joined are simultaneously provided with fingers by means of a single cutter forwarded between opposed, trimmed and exactly positioned ends of the clamped pieces of lumber to be joined. Thus the fingers produced in the two pieces will be in register, whereas the fingers in the completed join for intermeshing must be in a staggered relation. Thus the table supporting one piece of lumber must be vertically displaced between two levels the distance of which is equal to half the width of a finger.

It is a primary object of the present invention to provide an improved machine of the kind referred to which will be suitable for a continuous high-speed automatic end-to-end finger joining of pieces of lumber to form a continuous string which is then cut into pieces of a desired standard length.

It is a further object of the invention to provide a machine of the kind referred to provided with means for successive feeding of the lumber pieces of random length in their longitudinal direction from a magazines to a joining station where they are arrested and clamped with their ends in exact position for the finger-cutting operation.

A further object of the invention is to provide a woodworking machine of the kind referred to with cutter means for simultaneously cutting of the fingers with one and the same cutter in opposed ends of the two lumber pieces to be joined in the staggered relation so that after applying of the glue the fingers of the last-fed piece of lumber by a further advancing will intermesh with the fingers of the other piece.

Still a further object of the invention is to provide a machine of the kind referred to with means for applying a longitudinal pressure on the joint, thus produced to ensure even distributing and binding of the glue to enable further handling of the joined members without danger of the joint getting loose even though the glue may not yet have set.

A further object of the invention is to provide a machine of the kind referred to with means for cutting the continuous string of joint lumber pieces into pieces of a desired specified length without interfering with the operation cycles of the joining station.

The foregoing and other objects and advantages of the present invention will more readily appear from the following specification with reference to the accompanying drawings, which diagrammatically show a woodworking machine according to the invention, and where details well known to those skilled in the art and not forming part of the present invention are omitted.

Figure 1:
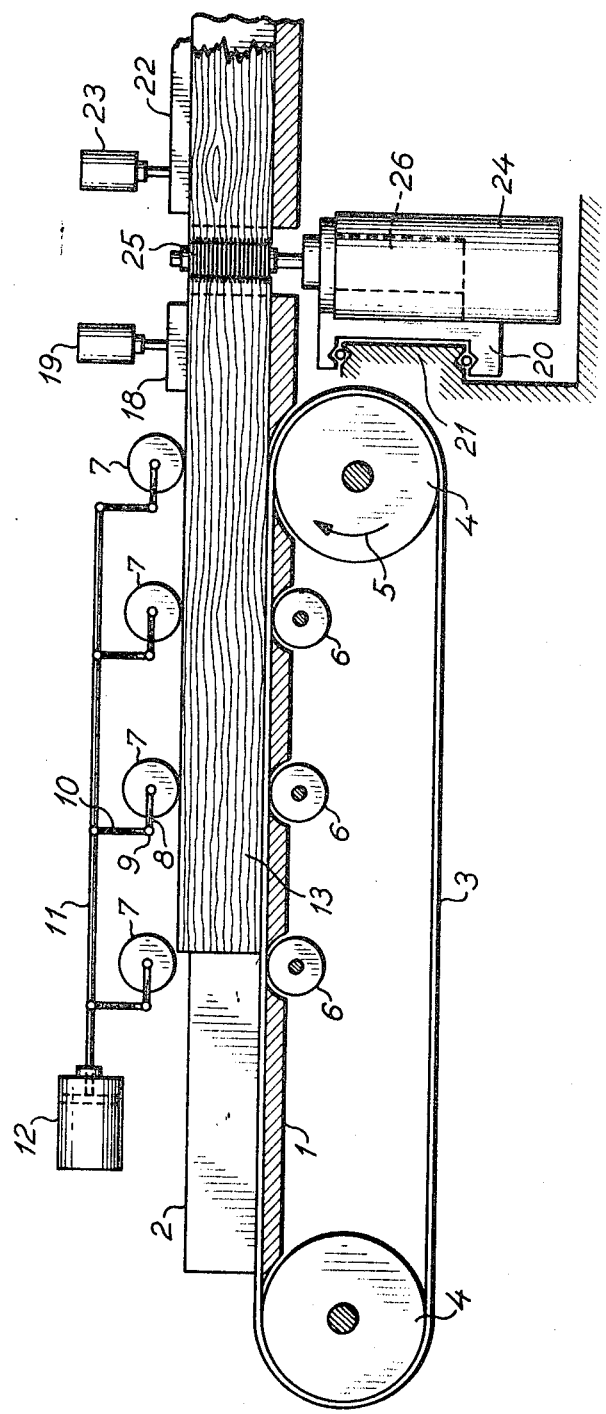
FIG. 1 is a side elevation partly in section of a first part of the machine, including a magazine, and some of the feeding means, whereas other of the feeding means for the sake of clearness have been omitted, and a joining station.
Figure 3:
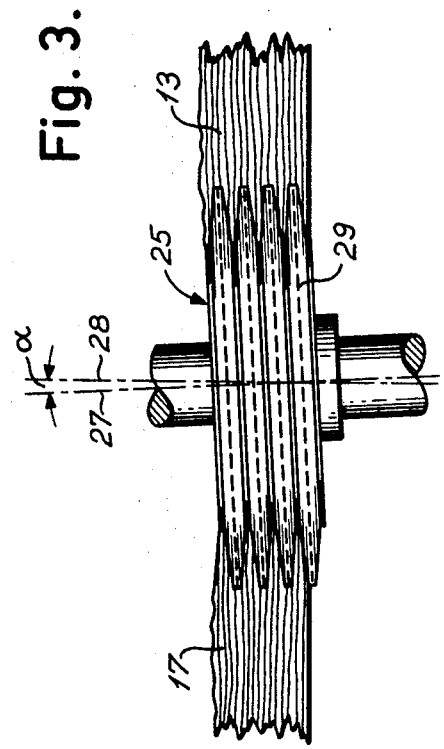
Figure 2:
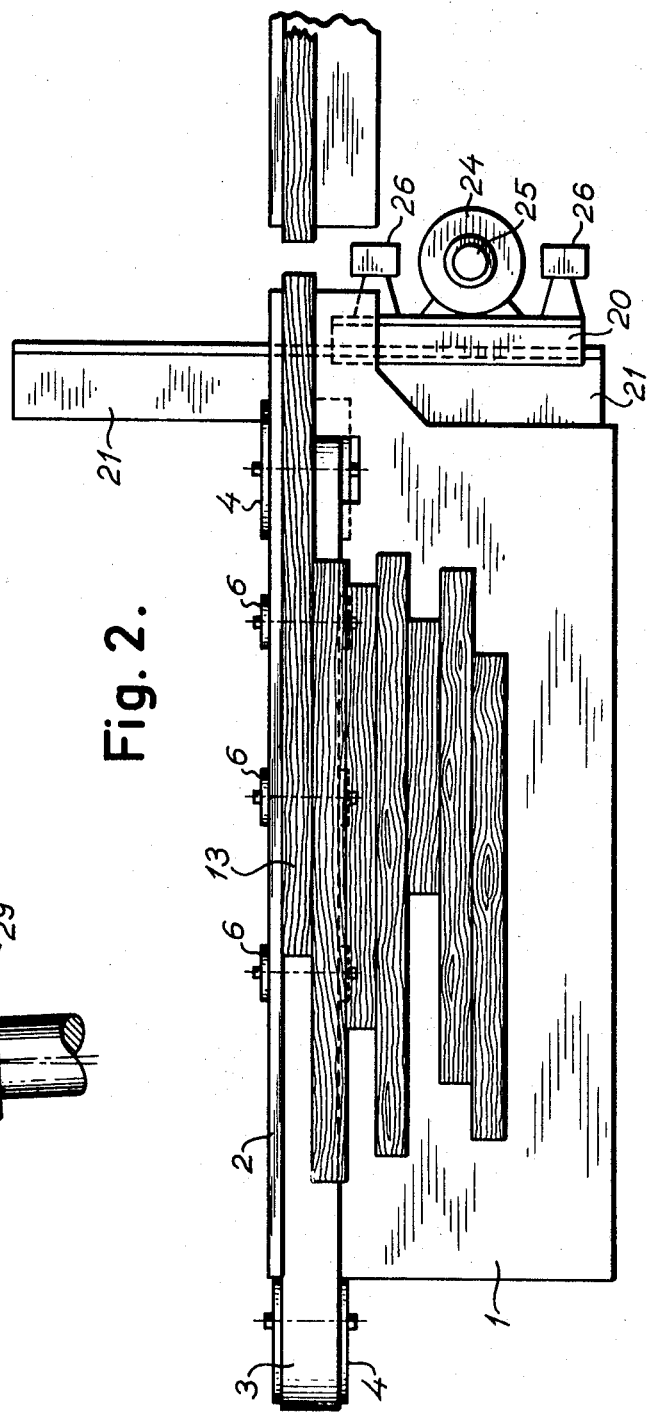
FIG. 2 is a plane view of the same first part of the machine but with the upper part omitted.
Figure 4:
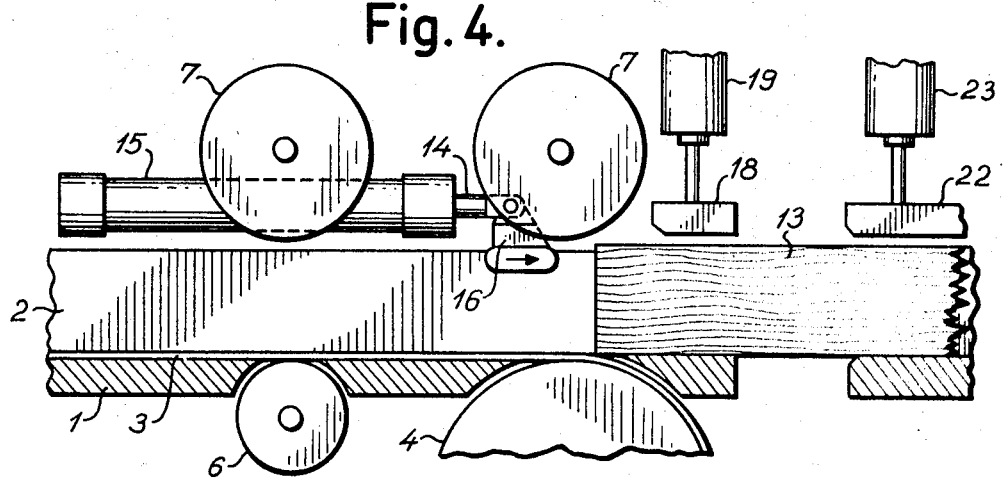
Figure 5:
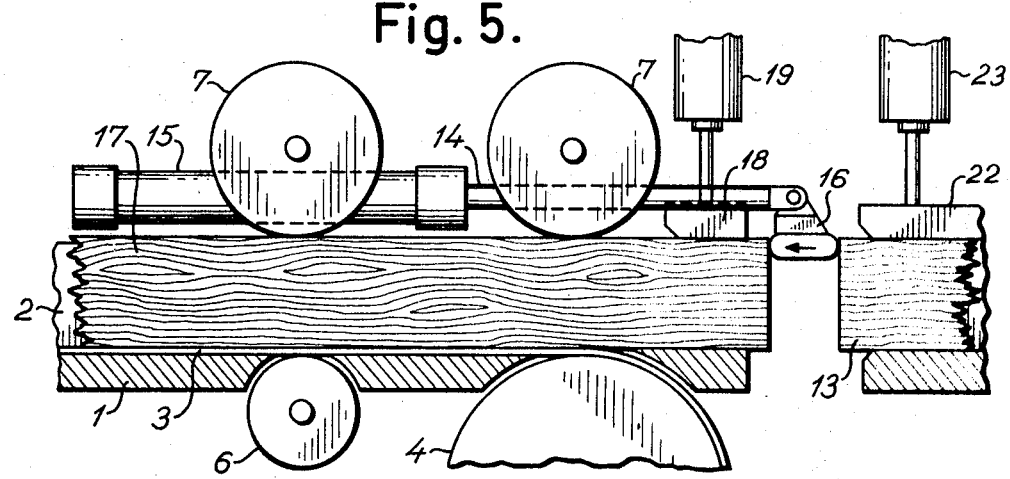
Figure 6:
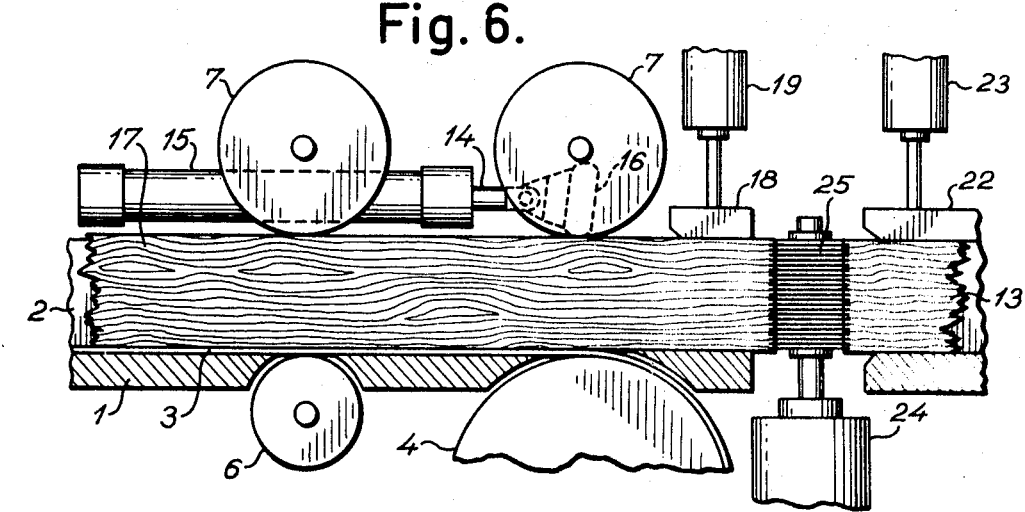
Figure 7:
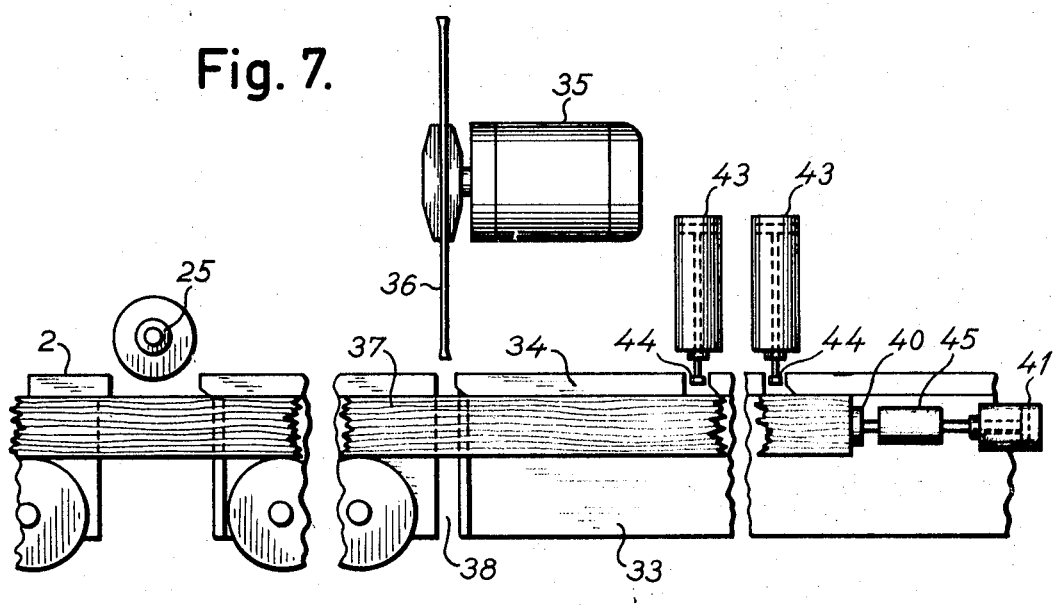
Figure 8:
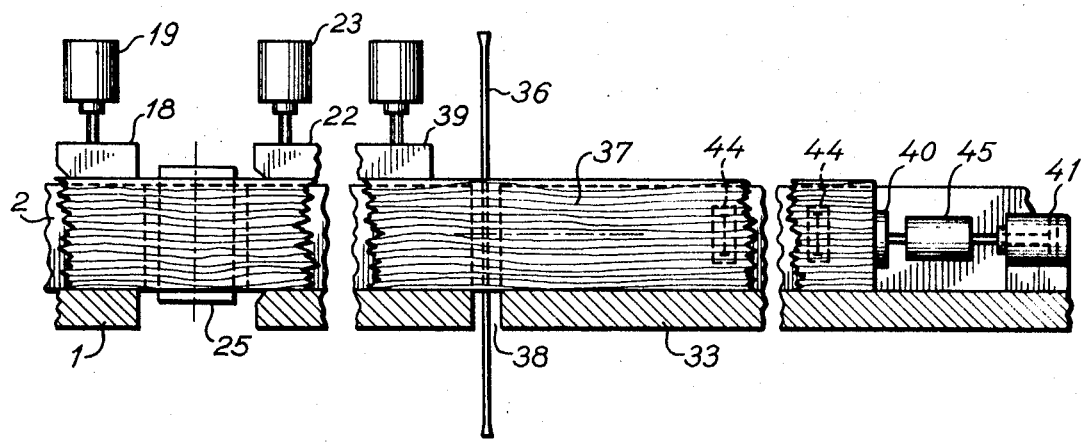

FIG. 3 schematically illustrates the arrangement of the finger-cutting means;

FIGS. 4–6 in greater scale and partly in section illustrates the end of the magazine adjacent the joining station with the feeding means omitted in FIG. 1 and 2 shown in three working positions;

FIG. 7 is a plane view of the second part of the machine including a station for cutting off the string of joint lumber pieces in the prescribed standard length; and FIG. 8 is a side elevation partly in section of the same part of the machine.

Referring now to FIGS. 1 and 2 the magazine comprises a table 1 on which oblong wooden members or pieces of lumber to be joined are placed side by side. By any suitable and well-known means these pieces of lumber are forced laterally against a fence 2 provided at the one side of the table 1. Adjacent the fence 2 a conveyor belt 3 is placed with its upper part flush with the upper surface of the table 1. The conveyor belt 3 is carried by two rollers 4, one of which is driven continuously in the direction shown by the arrow 5. The intermediate part of the belt 3 is supported by idle rollers 6. The conveyor belt 3 is made of an endless band of steel with a smooth surface so that the friction between the belt 3 and a piece of lumber 13 resting on the belt will normally not be sufficient to overcome the frictional forces between the lumber 13 and the fence 2 and adjacent piece of lumber pressing against it respectively.

Over the belt 3 a number of pressure rollers 7 are arranged, each freely rotatably mounted on the end of an arm 8 of a bellcrank lever pivotally mounted at 9 on the machine frame, the other arm 10 of which is hinged to a push rod 11 connected to a hydraulic cylinder 12. When the cylinder 12 is actuated, the rollers 7 will be pressed against the piece of lumber 13 increasing the friction between the lumber and the continuous-running belt 3, so that the piece of lumber will be fed to the joining station, that is to the right in the drawing. However, when the last end of the lumber has passed the last pair of rollers 4, 7, which for technical reasons have to be a short distance away from the joining station, further advancing of the lumber on the belt 3 will not be possible. From this position the further advancing of the lumber according to the invention is achieved by means of a special feeding mechanism as will appear from FIGS. 4–6, and which for the sake of clarity is not shown in FIGS. 1 and 2. This feeding mechanism consists of a hydraulic cylinder 15, wherein a piston is movable together with a piston rod 14. On the free end of the piston rod 14 there is pivotally mounted a pawl 16 of the special configuration as would appear from FIGS. 4–6 and the following description. The pawl 16 is formed so that when not subjected to outer forces it will hang down from its pivot as shown in FIG. 4 with its lower part within the path of the piece of wood to be forwarded. In this position the rear edge of the pawl abuts against the piston rod 14 so that the pawl cannot be turned further backward when by actuating of the cylinder 15 the pawl is moved until its front end abuts the backward end of the piece of lumber 13 for further advancing of the same until it has reached the proper position, as shown in FIG. 5, for the operations to be carried out in the joining station.

To ensure the exact position of the rear end of the lumber piece 13 the forward movement of the piston rod 14 is stopped by an abutment not shown and a clamp 22 actuated by a hydraulic cylinder 23 is pressed slightly against the lumber piece 13 to act as a break.

When the backward end of the lumber piece 13 has passed the pressure rollers 7, the same have been lowered so as to prevent the next piece of lumber in the magazine to be transferred in a lateral direction onto the belt 3.

When the piston rod 14 and the pawl 16 have reached their forward end position as above described, the hydraulic cylinder 12 will be activated to lift the pressure roller 7 to allow the next piece of lumber 17 to be transferred laterally to the belt 3, whereafter the pressure oil supplied to the cylinder 12 is reversed, so that the pressure rollers 7 will be pressed against the next piece of lumber 17, so that it will be forwarded against the joining station by the continuous-running belt 3 until it is stopped by abutting against the rearward end of the pawl 16 as shown in FIG. 5. The dimension of the lower part of the pawl 16 in the direction of feed is equal to the distance required between the opposed ends of the pieces of lumber 13 and 17 which is required for the action of the cutter for cutting the finger joints in the joining station, as will be described below. As the piece of lumber 17 is approaching the joining station, the pressure of the rollers 7 are relieved and the clamp 18 activated by a hydraulic cylinder 19 and lowered to effect a breaking action on the lumber piece 17.

When the piece of lumber 17 has reached the desired position as described above, the piston rod 14 will be retracted whereby the pawl 16 owing to its pivotally mounting on the piston rod 14 and the rounding of its forward and backward ends as shown in the drawing, will be pulled out from the space between the opposing ends of the lumber pieces to be joined to the position shown in FIG. 6. Simultaneously, full hydraulic pressure would be supplied to the hydraulic cylinders 19 and 23, so that the pieces of lumber will be firmly held in place by the clamps 18 and 22. Now the machine is ready for initiating the sequence of operation of the joining station.

The joining station, see FIGS. 1 and 2, comprises further to the clamps 18, 19 and 22, 23 a carriage 20 supported on a guide 21, said carriage being displaceable by hydraulic means not shown on the guide 21 in a direction perpendicular to the direction of the feed of the lumber pieces. The direction of displacement of the carriage may preferably, but not exclusively, be horizontal. The carriage 20 carries on its intermediate part a motor 24 with a vertical shaft on the end of which a cutter as will be described below, is mounted. On either side of the motor 24 the carriage 20 carries a glue-supplying device 26, which may be of any convenient and well-known construction, for instance with nozzles for applying the glue by spraying or with rollers which can be lifted and lowered in contact with the surfaces to be provided with glue.

The cutter 25 may be of any suitable known construction and preferably of the kind provided with two sets of tools of which one set is adapted for cutting the finger notches and the other set adapted for trimming the finger ends. Thus the opposing lumber ends to be provided with fingers in the joining station should be held apart a distance equal to $D-2h$, where $D$ is the outer diameter of the cutter and $h$ the height of the fingers. To allow for some inaccuracies in the trimming of the lumber ends the said distance, which, as mentioned above, is defined by the length of the pawl 16, may be a little smaller than the value given by the above formula, as the tools mentioned above for trimming the finger ends will be able to correct this discrepancy provided it is only of moderate size.

According to the invention the axis of the cutter will not lie in a plane perpendicular to the direction of feed of the lumber pieces, but is tilted a small angle in the magnitude of about 2° either forward or backward in the direction of feed, that is in a plane perpendicular to the direction of displacement of the cutter, see FIG. 3 where this angle is indicated by $\alpha$. The magnitude of this angle depends on the dimension of the cutter and the exact value of $\alpha$ as defined by the following formula:

$$\sin \alpha = w/2(D-h)$$

where $w$ denotes the width of a finger and $D$ and $h$ the same as stated above. By this provision is achieved that fingers cut simultaneously with the same cutter in the opposing ends of lumber to be joined, will be in a staggered relation and thus permitting the two ends to be joined immediately by forwarding the one piece of lumber in the direction of feed without the necessity of a vertical shift of the one table in relation to the other between the cutting operation and the joining operation. Hereby the design of the machine will be considerably simplified, resulting in saving in weight and costs of manufacturing. It should be noted that the resulting obliquity of the fingers owing to the small value of the angle $\alpha$, which will in general not exceed 2°, will easily be absorbed by elastic deformation of the wood, and therefore be without any significance.

In the machine according to the invention preferably a cutter is used to produce fingers of very small size, that is with a finger height of less than three-eighths inch and preferably between one-sixteenth inch and one-fourth inch.

The operation of the joining station is as follows:

When the pieces of lumber are forwarded and stopped in the position shown in FIG. 6 and the pawl 16 withdrawn as mentioned above and the clamps 18 and 22 are clamping the lumber with full pressure, the displacement of the carriage 20 from one of its positions is initiated. By the movement of the carriage the cutter 25 which is running continuously, will during its passage cut out the fingers in the opposed ends. By the further advancing of the carriage 20 the one glue-supplying device 26, which is following the cutter, will be activated and apply glue or other bonding agent to the opposed surfaces, which are now provided with fingers, and the carriage will stop in its opposite end position. Then the pressure on the clamp 18 is released and the hydraulic cylinder 12 activated so as to press the pressure roller 7 against the lumber, so that the same will be advanced at the belt 3, whereby the fingers on the opposed lumber ends will be brought into meshing contact. Simultaneously, the clamp 23 as well as other clamps acting on the continuous string of joint lumber pieces as will appear from the following are released, so that the forwarding of the string of joint lumber pieces may continue until the pawl 16 drops down behind the rear end of the lumber pieces 17 and will continue the forwarding as described above.

The forward movement of the string of joint lumber pieces thus formed by the belt 3 may be continued by the pawl 16 and associated feeding mechanism as described above, until the rearward end of the string has reached the desired position in the joining station as shown in FIG. 5, and the operation cycles of the joining station will then be repeated, whereby, however, the carriage 20 during the operation will be moved in the opposite direction and the applying of the glue will be performed by the second glue-applying device. Thus, in these operations cycles the carriage 20 will operate in alternate directions, whereby an idle return movement in connection with each operation is avoided.

Generally, however, this forward movement for other reasons, as will be more fully described in the following, will be temporarily stopped before the string joint lumber pieces has reached the said position according to FIG. 5.

The last part of the machine is a cutting-off station shown in FIGS. 7 and 8, wherein the position of the joining station is indicated by the cutter 25. The main parts of the cutting-off station are the table 33 with a fence 34 which are placed in alignment with the table 1 and fence 2 respectively of the magazine. Further, a cutting-off saw which may be circular saw 36 driven by a motor 35. The assembly 35, 36 is slidably mounted so that the saw 36 may enter a slit 38 in the table 33 and fence 34 for cutting off the strings of lumber. The assembly is moved by a hydraulic cylinder not shown. The cutting-off station further comprises an end stop assembly 40, 41, 45, which will be more fully described in the following.

The end stop 40 is connected to a piston displaceable in a hydraulic cylinder 41 when the end stop 40 is hit by the forward end of the string of lumber pieces it will press the piston against the bottom of the cylinder 41. This causes the action of the feeding means to be stopped either by releasing the pressure in the hydraulic cylinder 12 or the hydraulic cylinder 15 as the case may be and simultaneously the hydraulic cylinder 23 supplied with pressure oil at full pressure to activate the clamp 22. This being accomplished, pressure oil is supplied to the hydraulic cylinder 41 for a short period to cause the end stop 40 to exert a counterpressure on the forward end of the string to press the finger joint just made hard together, whereby the glue will be more evenly distributed and excess of glue pressed out of the joint. Further the fingers owing to their wedge shape will be mechanically bound together. Generally a rather high counterpressure will be necessary for this purpose, which involves the risk of the lumber being cleaved by the fingers. This risk may be avoided and a lower counterpressure will be sufficient as according to the invention an oscillating pressure is used. This is accomplished by inserting a mechanical oscillator or vibrator 45 between the end stop 40 and the piston in the cylinder 41. The vibrator 45 is preferably of the kind which frequency and amplitude can be adjusted so as to accommodate for any given kinds of wood and size of the lumber. Such vibrators are well known and available on the market and should preferably be of the kind the frequency and amplitude of which can be adjusted so as to accommodate for any given kinds of wood and size of the lumber. Such vibrators are well known and available on the market and should therefore not be described in detail.

The counterpressure and especially the vibrating counterpressure need only to be of a short duration.

The end stop assembly 40, 41, 45 is mounted on the table 33 so as to be adjustable in the direction of feed of the lumber string, whereby the length of the lumber piece to be cut off can be adjusted to any desired value.

When the counterpressure exerted by the cylinder 41 has been released the cutoff saw 36 is forwarded through the slit 38 to cut off a lumber piece of a desired length. When this is accomplished, the cutoff end is gently transferred laterally on the table 33 away from the fence 34 by means of push rods 44 driven by hydraulic cylinders 43. When the part of the table 33 next to the fence 34 is cleared, the push rods 44 are retracted and then the forwarding of the lumber spring is resumed by releasing the clamps and applying a pressure to the hydraulic cylinder 12 or 16 as the case may be.

It will be seen that during the cutting off by the saw 35, 36 the forward movement of the lumber string through the machine has to be stopped, which normally involves that the operation of the joining station has to wait. To avoid this and further increase the capacity of the machine it will be possible to mount the cutting-off saw 35, 36 and the end stop assembly 40, 41, 45 on a common frame displaceable in the longitudinal direction so that it can follow the forward movement of the lumber string during the cutting-off operation. When the cutting off is accomplished, the frame will return to its starting position. Hereby interference of the operation of the joining station with that of the cutting-off station is avoided.

The pump and the piping system for supplying pressure oil for the hydraulic system as well as the control system for controlling the valves in the hydraulic system in accordance with the sequence of operations described above are well known to those skilled in the art and as the said system—per se—does not form a part of the present invention they will not be described in details.

It will be understood that the woodworking machine described is of a simple construction so that it can be manufactured at moderate costs and that a simple control system will be able to control all the operations of the machine in a full automatic way.

What I claim is:

1. A woodworking machine for endwise joining of oblong wooden members by means of finger joints, said machine comprising:
   a magazine for side-by-side storing of oblong wooden members to be joined,
   feeding means for successive longitudinal feeding of the wooden members from said magazine, and
   a joining station for receiving the wooden members and comprising a single cutter means for simultaneously cutting off fingers in opposed ends of two wooden members to be joined while said wooden members are maintained in the same horizontal plane, means for applying glue to the cut finger ends and means for joining the glued cut fingers in meshing relationship, whereby cutting, glueing and joining of the wooden members are accomplished at the same station in said machine.

2. A woodworking machine according to claim 1, wherein the feeding means comprise a hydraulic power means having a piston rod displaceable parallel to the direction of feed, said piston rod having on its free end a pawl pivotally mounted so as depends from the piston rod into the path of the wooden members to be fed and having a dimension in the direction of feed equal to the distance between the opposed end surfaces of the wooden members to be joined which is required for simultaneously cutting of fingers in said ends.

3. A woodworking machine according to claim 1 in which said cutter means is mounted on a carriage for displacement in a direction transversely to the direction of feeding, the axis of rotation of said cutter being inclined a small angle with the plane normal to the direction of feed, the sine of said angle being equal to half the finger width divided by the outer diameter of the cutter less the height of the finger.

4. A woodworking machine according to claim 1 having a cutoff station including an end stop, said end stop being connected with hydraulic power means adapted for temporarily exerting a counterpressure on the forward end of the string of joined wooden members being fed from the joining station, said end stop further being provided with vibration-generating means.

5. A woodworking machine according to claim 1 wherein the cutting-off station is provided with a cutting-off saw for displacement transversible to the direction of the feed.